N. JONES.
Car-Axle.
No. 199,208. Patented Jan. 15, 1878.
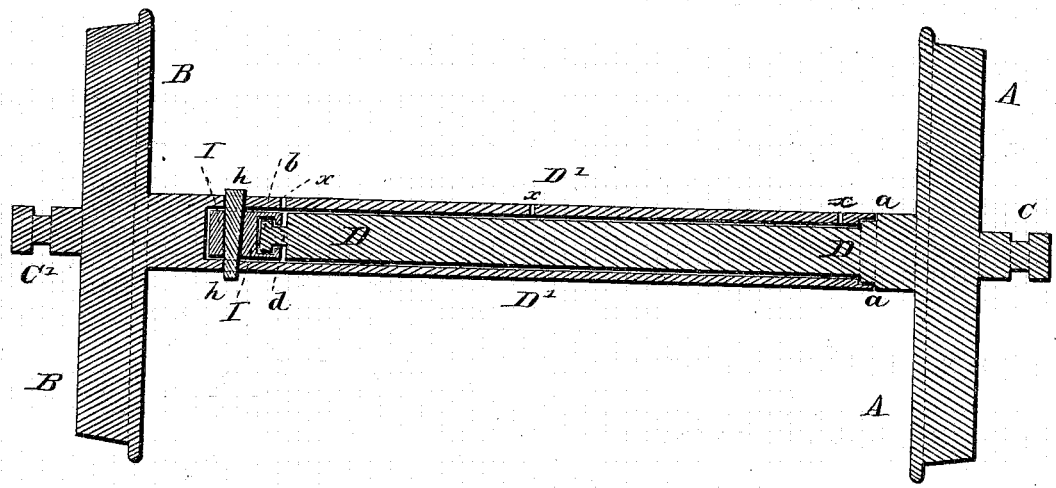

UNITED STATES PATENT OFFICE.

NATHANIEL JONES, OF SYRACUSE, NEW YORK.

IMPROVEMENT IN CAR-AXLES.

Specification forming part of Letters Patent No. 199,208, dated January 15, 1878; application filed December 29, 1877.

*To all whom it may concern:*

Be it known that I, NATHANIEL JONES, of Syracuse, in the county of Onondaga and State of New York, have invented certain new and useful Improvements in Car-Axles; and I do hereby declare that the following is a full, clear, and exact description of my invention, which will enable others skilled in the art to which it appertains to make and use the same, reference being had to the accompanying drawing, and to the letters of reference marked thereon, which form a part of this specification.

My invention relates to that class of car-axles which are made in two parts, one inserted in the other, and each having a car-wheel; and the nature of my invention consists in the construction of devices whereby all lateral motion of the wheels is prevented, and the wheels yet allowed to rotate independently of each other, as will be hereinafter more fully set forth.

The annexed drawing represents a longitudinal section of my invention.

A and B represent the two car-wheels of one pair or set. The wheel A is, on its outer side, provided with the usual journal C, and from the inner side projects a solid axle, D. The wheel B is provided with a similar journal, C', and a hollow axle, D', of such interior diameter as to fit over and around the solid axle D. The solid axle D is turned down, so as to form a circumferential shoulder, $a$, at a suitable distance from the wheel A, and the end of the hollow axle D' forms a joint with said shoulder. This joint may be either a lap-joint, as shown in the drawing, or it may be simply square shoulders abutting against each other, or in any other suitable form. The extreme end of the solid axle D is formed with a head, $b$, and neck $d$, which constitutes a swivel. This swivel is inserted and held in a hollow cylindrical piece, I, which is of the same outside diameter as the body of the solid axle D, and fits closely around the neck $d$. This piece I is held in the inner end of the hollow axle D' by means of a pin or key, $h$, of any suitable or convenient form, passing through the hollow axle and through said piece I.

The block I may be made of a single piece of metal, bent centrally, to form the cylinder and encircle the end of the axle, that portion of the metal which lies in the groove or neck being previously shaped to fit the same; or the block may be made in two pieces—that is, bisected longitudinally—and, when slipped into the hollow axle, the parts are by the same prevented from separating; or it may be constructed in any other suitable or convenient manner.

This construction of car-axle is especially intended for street-cars or other light work. The wheels rotate independently of each other, and the solid axle, by means of its swivel being held in the hollow axle, prevents any lateral motion whatever.

If the parts be made heavy enough this car-axle may be used for any purpose where applicable. Suitable lubricating-holes $x$ are made in the axle.

Having thus fully described my invention, I claim as new and desire to secure by Letters Patent—

The combination of the wheel A, having solid axle D, with shoulder $a$ and swivel $b$ $d$, the wheel B, having hollow axle D', and the hollow cylindrical piece I, encircling the swivel $b$ $d$, and held in the hollow axle by a pin or key, $h$, substantially as and for the purposes herein set forth.

In testimony that I claim the foregoing as my own I have hereto affixed my signature in presence of two witnesses.

NATHANIEL JONES.

Witnesses:
 FRANK GALT,
 C. L. EVERT.